March 23, 1948. R. C. JOHNSTON 2,438,219
PROJECTION LIGHT SOURCE FOR PHOTOGRAPHIC DEVICES
Filed Jan. 5, 1945

INVENTOR.
Robert C. Johnston.
BY
ATTORNEYS.

Patented Mar. 23, 1948

2,438,219

UNITED STATES PATENT OFFICE 2,438,219

PROJECTION LIGHT SOURCE FOR PHOTOGRAPHIC DEVICES

Robert C. Johnston, Binghamton, N. Y., assignor to General Aniline & Film Corporation, New York, N. Y., a corporation of Delaware Application January 5, 1945, Serial No. 571,550

5 Claims. (Cl. 88—24)

This application pertains to an invention in light sources for photographic purposes and, more especially, to a light source which is adapted for use in printing or projecting color transparencies or other color pictures. In certain more modern color systems, a colored picture or print, either a contact or projection print, is made by a so-called "one shot" system. That is in contrast to methods in which a number of negatives are generally first made after which each is employed for printing a single color; for example, the well-known color separation systems. When printing a color negative or color positive on sensitized material which will record the various colors in the original at a single step or projection, the light source used for that projection must have certain requisite components of the three primary colors so as properly to balance those colors in the resulting print. It is well known that artificial sources of illumination, such as tungsten or photo-flood type lamps, emit light having varying amounts of the primary colors. It is also well known that variation in voltage of the power supplied to the lamp filament produces very marked changes in the spectral quality or composition of the light emitted. It is, of course, possible to employ a single lamp adapted to give white light, and by proper control of voltage, the spectral composition of the light from such a lamp may be controlled within the limits of distribution of radiation from hot bodies. Artificial illumination of all types is well known to be deficient in certain of the colors, and, for that reason, filters are commonly employed so as to absorb a portion of other colors and thereby obtain a color balance approximating that desired.

It is an object of the instant invention to devise a light source such as may be employed in color printing in which each of the primary colors may be made available for illuminating the original to be printed, in practically any desired proportion to the total incident light falling upon the said original. There are two objectives, which are realized by the system herein disclosed, first it is possible to balance the spectral composition of the total light supplied by the source to obtain a standard light adapted to general printing with the sensitized material being used. Secondly, the invention makes it possible to balance or regulate the spectral composition of the light so that a negative or other transparencies being printed may have certain colors which are out of balance in the original, corrected in the resulting print. As an alternate of the last-mentioned objective, the color balance of the original may be varied thereby to obtain some special effect, as is frequently desired.

It is also an object of the invention to devise a simple but efficient light source for enlargers to be employed for color printing or for projectors for color work. It is a further object of the invention to devise a system of mounting or attachment of the moving power unit to a projector or enlarger in such a manner that the vibration thereof shall have no undesirable effect on the projected image.

The invention is herein described as applied to the lamp housing of a projection type printer or enlarger, but it is to be understood that the invention is applicable to other projecting or photographic printing mechanisms. The disclosure of one embodiment and modifications thereof should serve to teach the principles of the invention and its application to different types of photographic equipment for which it is adapted.

Briefly, the light source includes a plurality of light units each of which emits a white light, or at least, a light having some desired one of the primary colors of white light. These sources of light are separately housed and are so related to a central light mixing chamber or housing which is, for the usual photographic enlarger, the lamp housing of that enlarger. Within the mixing chamber, means is provided for receiving rays of light from the separate sources and for transmitting or projecting that light through the original to be printed or projected, the usual light concentrating and/or diffusing means being employed at the proper position. Rays from each of the separate sources of light must pass through a filter prior to entering the mixing chamber, and thus, only desired colors of the light from those sources actually reach the chamber. A reflector or mirror is preferably employed for gathering the various colored rays of light and for projecting those rays through the original as above described. The reflector is moved as by rotating and during its revolution or other movement receives and reflects an equal amount of light from each source (assuming each source to be of equal intensity). The three colors of light may be thus gathered and reflected to be passed through the original by a single rotation of the reflector, or alternately, the reflector may be rotated at such speed as to perform its cycle a plurality of times during a single exposure or for projecting an image to be observed for a relatively long period of time.

Of course, movement of the mirror or other reflecting means is accomplished by application of power from some suitable source. The fact that the reflector is moved and that power must be applied, leads to a problem of vibration or disturbance of the supporting structure which normally would be the lamp housing or other enclosure for the illuminating means. In such highly critical work as photographic enlarging, stability or rigidity of the enlarger is very essential. To that end, the moving parts may be so mounted in relation to the other elements of the instrument that vibration may be absorbed or damped to a point where its effect is practically nullified.

The invention will be described in greater detail by reference to the accompanying figures of drawing in which.

Figure 2:
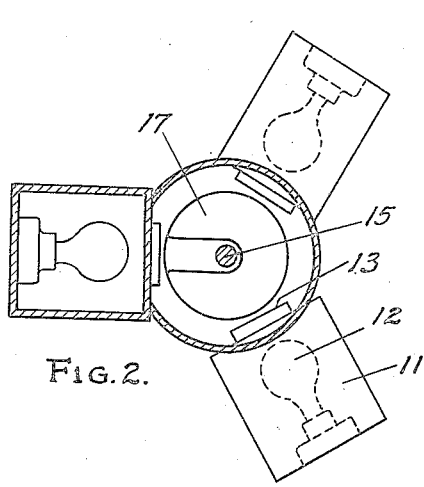
Fig. 2 is a horizontal section taken on the line 2—2 on Fig. 1.
Figure 1:
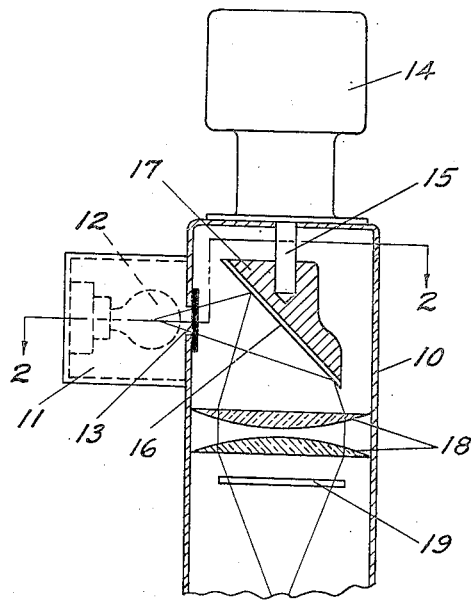
Fig. 1 is a vertical section through part of a photographic enlarger to which the invention has been applied.

Now referring to Figs. 1 and 2, the preferred form of the invention is shown as the same would be applied to a photographic enlarger. What would normally be the lamp housing of the enlarger is shown at 10, and instead of having a centrally disposed source of illumination, that housing has a plurality of radially extending enclosures 11 within each of which is a source of illumination 12. Wiring for conveying current to each of the sources would be employed, but in these figures, for the sake of simplicity of illustration, that wiring is not shown. The means for emitting radiation is preferably a tungsten or a photo-flood incandescent light bulb of a type producing white light comprising the primary colors in some proportion. Each of these extensions 11 is in registry with an opening in the side of the housing or chamber 10, and light from the source 12 passes through that opening into the center of the housing or chamber 10. Before passing into that chamber the light is intercepted by a filter 13. A suitable filter is employed with each light source so that one will supply red light only, another green, and the third will supply blue. Depending upon the spectral characteristics of the light at the source, these filters may be of different colors and different densities so that for normal purposes, the light actually present within the chamber 10 shall have definite proportions of red, green, and blue, those proportions being determined by the spectral quality of the light for which the emulsion on which the original is projected, is designed. Above the chamber or housing 10 is mounted a source of power, herein shown as an electric motor 14. That motor is of vertical type, has a depending shaft 15 and is adapted to rotate a reflecting means which includes a mirror 16, preferably circular in form and carried at a proper angle by a hub or holder 17. This hub is keyed or otherwise fixed at the end of the shaft 15. The reflecting means 16 may be a highly polished metallic surface or may be a glass plate having a silvered back as in common types of reflectors. Any reflecting means will serve so long as it does not affect the color of the light and so long as it is rugged enough to be rotated at a rapid rate. As a variation, certain types of prisms may serve very satisfactorily. As shown in Fig. 1, light from each of the independent sources, filtered to absorb all of the light except that particular color for which that source is employed, is reflected downwardly through the condenser 18, then through the original 19, and thence through a suitable lens and onto the sensitized emulsion of which the picture is to be made. Of course, the condenser 18 may be replaced by diffusing means such as a lenticular screen or an opal glass, or both the condenser and the diffusing means may be employed. The original specimen 19 which is preferably a colored transparency in the form of a negative or positive is held within a suitable slide or holder and is maintained at the proper position for projection in the normal way. The lens or objective may be of any convenient type and should be provided with means whereby it may be focused.

While an electric motor has been described by way of preference, other means for rotating the reflector may be employed, for example, the well-known spring motor. In either event, it is preferable that the rotation be governed so as to impart to the reflector a more or less definite and constant number of revolutions per unit of time. In one instance, projection for exposing sensitized material may involve only one revolution of the reflecting means. In that revolution it will pick up each of the three colors of light and will reflect that light for projecting the desired image. A simpler, or at least, a more easily applied system involves rotating the reflector at a relatively great number of revolutions per unit of time so that in fact the three colors of light are gathered and reflected through the original so that the cycle is repeated many times per second. That results in what practically amounts to mixing the light so that, for a given exposure, the three colors of light are integrated and pass through the original as white light for that particular period of exposure. In projecting color pictures onto a screen where they are to be observed over a period of time, of course, the latter method is essential.

Normally, it is intended that each of the light sources 12 shall be of equal intensity. However, that is not entirely necessary, and in certain types of work it may be preferred to have light sources, some of which are of higher candle power than others, thereby to give more of the particular color of light for which that source is employed.

Figure 3:
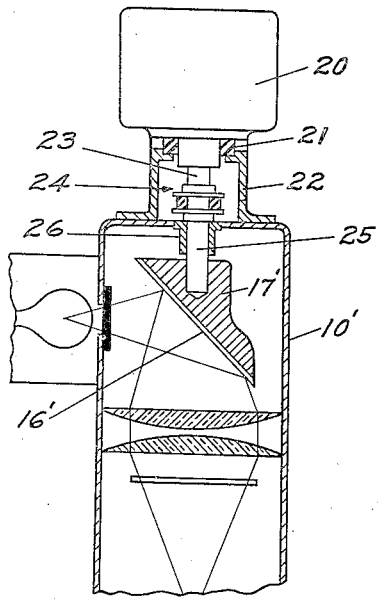
Fig. 3 is a section similar to Fig. 1, but showing a modification thereof.

Now referring to Fig. 3, a modification is shown in which corresponding parts are indicated by similar numerals as have been used in Fig. 1, except that those numerals have been primed. Since any type of electric motor or other means of power is likely to have some vibration, and since the success of the enlarging process is to a great extent dependent upon the relative rigidity of the various parts of the mechanism, it becomes evident that any vibration should be confined to the source of power and not conveyed to the other elements including the light source, holder for the original, the lens or the sensitized material and its support. In this Fig. 3, the source of power 20 is mounted on a cushioning or shock absorbing block or a ring 21 which is in turn held in a support flange or connecting piece 22 fixed to the housing 10'. The shaft 23 extending at the lower side of the motor has a coupling, generally designated by numeral 24, and which may be of any of the cushioning or other types for absorbing vibrations and power impulses. The particular coupling herein shown includes flanges one of which is connected to the shaft 23 and the other of which is fixed to shaft 25, rotatable within a bearing 26 fixed at the upper end of the housing 10'. A rubber block or other shock absorbing medium serves to connect one half of the coupling with the other.

Other shock absorbing devices may be employed, and of course, it is very essential that the source of power 20 be one adapted to operate with as little vibration as possible. Its speed is so chosen as to obviate all types of vibration, that is, it should be operated its best speed from that point of view. The rotating parts including the shaft 25, hub 17' and reflector 16' are all balanced dynamically and should produce practically no appreciable vibrations when rotated at the speed for which the device is designed.

As above mentioned, in certain instances it is contemplated that, instead of illuminating the original with light of specifications for which the sensitive emulsion is designed, corrective illumination may sometimes be desired. In that event, either the filters 13 or the light sources 12 may be varied. For example, if it is desired to correct a transparency deficient in one of the colors, and standard practice would reproduce that original with the same balance of colors, one of the filters may be altered so as to add to that color of light which is deficient. That is, if the transparency is deficient in red, not only the red illumination from the so-called red filtered source would be employed, but one of the other sources may be supplemented by a different filter which will not cut out all of the red from that light and, therefore, enough of that particular color may be added so as to give a better balance of colors in the final projected image.

It is also possible to accomplish the same result by voltage control for the different light sources. Each of the light sources is so designed as to have its voltage varied independently of the others, and by varying the voltage, the spectral characteristics of the emitted light are also varied. As a parallel illustration, increasing the voltage of that light in line with the blue filter, the blue radiation would be increased, or alternatively, suitably increasing the voltage on the red filtered light would increase the red radiation. Such disturbance of the color balance in the light from the so-called normal for which the emulsion is designed could be employed for correcting an improper color rendition in a transparency, or for accentuating certain colors thereby to obtain some desired aesthetic effect.

Figure 4:
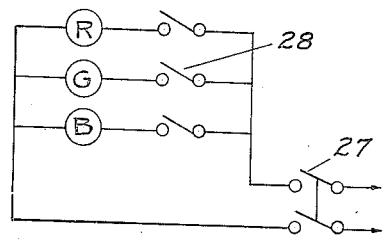
Fig. 4 is a diagrammatic view illustrating voltage control as applied to the separate light sources.

Referring to Fig. 4, the diagram illustrates a simple means for wiring the red, green, and blue light sources, and switches for controlling them. Power is brought in from any convenient line and a master switch 27 may be employed to energize or to exclude current from the circuit. Independent switches 28 are employed to light the separate sources. Normally each of the switches 28 is closed so that only the master switch need be used for lighting the entire unit. In the event voltage control is to be employed, it is independently applied in each of the independent circuits so that any one of the lamps may have the spectral characteristics of its light changed independently of the others.

In place of, or in addition to, the switch 27 any one of the well-known timing devices may be inserted in the line. Such a timing device is used to control the exposure during enlarging or other printing of a colored picture.

Sometimes it may be desired to employ more than three sources of illumination; an additional source of white light being used for certain purposes, for example, when the enlarger is used in projecting black and white rather than colored pictures. Of course, the system illustrated may be used for black and white pictures as well as for color, and probably the addition of an additional light source would serve to supplement the three colored sources more often than it would be used alone.

It may be preferred to employ light sources which emit light of a single color rather than to use white light and filter it. Colored bulbs may thus be employed and this specification is not to be restricted to the use of any particular kind of light source or to the employment of a plurality of light sources each of which is modified by the use of a filter.

Figure 5:
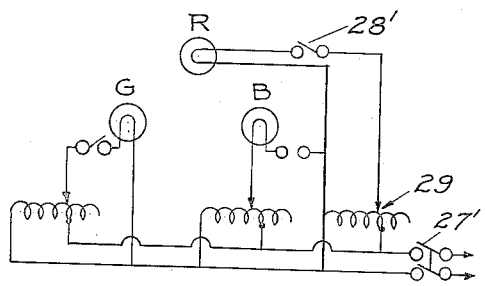
Fig. 5 is a view similar to Fig. 4, but showing a modified circuit.

Referring to Fig. 5, each of the lamps, as in Fig. 4, is controlled by a switch 28'. The line is controlled by switch 27'. Each lamp R, G or B is fed through an auto transformer 29. That permits the voltage to the lamp and the spectral composition of its radiation to be set at specified values.

In some enlargers and in practically all projectors the disposal of the mechanism would be horizontal rather than vertical as is illustrated. The same principles apply, and it will be quite evident to those skilled in the art that the mechanism is adapted to use in any type of photographic equipment where a light source of definite spectral specifications is desired.

While one embodiment and a modification of the invention have been disclosed, it is to be understood that the inventive concept may be carried out in a number of ways. This application is, therefore, not to be limited to the precise details described but is intended to cover all variations and modifications thereof falling within the spirit of the invention and the scope of the claims.

I claim:

1. A source of illumination for photographic printing or projecting means including in combination a central chamber, independent light sources associated with said chamber so that light from each of said sources is directed into the chamber, a filter for each of the independent sources by which certain colors of the light are absorbed before entering the chamber, and means for gathering and reflecting the colored light within the chamber including a reflector for successively intercepting rays from each source, and means for rotating it at a relatively rapid rate and so that the light rays entering the chamber through the said filters are integrated into an apparently continuous beam, and optical means to direct said beam through an original to be printed or projected.

2. A source of illumination for photographic printing or projecting means including in combination a central chamber, housings for independent light sources, one for each of the primary colors of white light, an opening with which each housing registers and through which light from the adjacent dependent source may enter the chamber, a filter for each opening, said filters being of a type for permitting a desired color only of the light to enter the chamber, reflecting means within the chamber including a rotatable mirror by which the rays of colored light from each separate source are successively gathered and successively directed into an apparently continuous beam, and optical means to direct said beam through an original to be printed or projected, and a motor for rotating said mirror.

3. A source of illumination for photographic printing or projecting means including in combination a central supporting chamber, separate light sources attached to said chamber, openings in the chamber at each source through which rays of light enter the chamber, a filter at each opening and reflecting means within the chamber adapted to be rotated and so positioned that in its rotary movement it successively intercepts rays from each of the light sources and directs them into an apparently continuous, integrated beam, and means for rotating said reflecting means including a motor, a shaft from said motor and a shaft for said reflecting means, a support for connecting the motor to the chamber and vibration absorbing means between the support and motor and a vibration absorbing coupling connecting the said shafts.

4. A source of illumination for photographic printing or projecting means including in combination a central supporting chamber, separate light sources attached to said chamber, openings in the chamber at each source through which rays of light from the source enter the chamber, a filter at each opening for permitting desired colors of light only to enter the chamber, reflecting means within the chamber including a hub and an angularly disposed reflecting surface positioned to intercept rays from each of the light sources and direct them into an apparently continuous, integrated beam, a motor having a shaft, a shaft for the hub of the reflecting means in alignment with the motor shaft, supporting means for the motor and a coupling for operatively connecting the motor shaft and the shaft to which the reflector is attached, and vibration absorbing means including an elastic connection between the motor and its support and an elastic vibration absorbing means at the said coupling.

5. A source of illumination for photographic printing or projecting means including in combination a light receiving chamber, separate light sources adjacent said chamber having therein means for directing a beam of light into said receiving chamber, each of said sources being adapted to supply substantially monochromatic light of one of the primary colors, means within the chamber including a driven, rotating reflector so positioned as to intercept the rays from each of the monochromatic sources once during a single revolution, and optical means for receiving and directing the rays reflected from said rotating means through an original to be projected, and means for varying selectively the relative proportions of the primary colors of light received and reflected by the said rotating means.

ROBERT C. JOHNSTON.

REFERENCES CITED

The following references are of record in the file of this patent:

UNITED STATES PATENTS

| Number | Name | Date |
| --- | --- | --- |
| 711,440 | Reichenbach | Oct. 14, 1902 |
| 1,070,699 | Kitsee | Aug. 19, 1913 |
| 1,513,077 | Welsh | Oct. 28, 1924 |
| 1,752,477 | Brewster | Apr. 1, 1930 |
| 1,949,892 | Wright | Mar. 6, 1934 |
| 2,169,022 | Chubb | Aug. 8, 1939 |

FOREIGN PATENTS

| Number | Country | Date |
| --- | --- | --- |
| 25,142 | Great Britain | 1912 |
| 464,637 | France | Jan. 17, 1914 |